United States Patent
Tullius et al.

(10) Patent No.: US 11,920,718 B2
(45) Date of Patent: Mar. 5, 2024

(54) ADDITIVE MANUFACTURED LIQUID MANIFOLD WITH ORIFICE

(71) Applicant: Raytheon Company, Waltham, MA (US)

(72) Inventors: Jami Frances Tullius, Tuscon, AZ (US); David Mutters, Tucson, AZ (US); Christopher L Hernandez, Vail, AZ (US); Brian M. Snider-Simon, Tucson, AZ (US); Gregory P. Hanauska, Tucson, AZ (US)

(73) Assignee: RAYTHEON COMPANY, Waltham, MA (US)

( * ) Notice: Subject to any disclaimer, the term of this patent is extended or adjusted under 35 U.S.C. 154(b) by 447 days.

(21) Appl. No.: 17/305,134

(22) Filed: Jun. 30, 2021

(65) Prior Publication Data
US 2023/0003325 A1    Jan. 5, 2023

(51) Int. Cl.
*F16L 41/03*        (2006.01)
*B33Y 80/00*        (2015.01)
*F15D 1/02*         (2006.01)
*B29C 64/124*       (2017.01)
*B29K 101/10*       (2006.01)
*B29L 23/00*        (2006.01)
*B33Y 10/00*        (2015.01)

(52) U.S. Cl.
CPC ............. *F16L 41/03* (2013.01); *B33Y 80/00* (2014.12); *F15D 1/025* (2013.01); *B29C 64/124* (2017.08); *B29K 2101/10* (2013.01); *B29L 2023/004* (2013.01); *B33Y 10/00* (2014.12)

(58) Field of Classification Search
CPC .......... F16L 41/03; B33Y 80/00; B33Y 10/00; F15D 1/025; B29C 64/124; B29K 2101/10; B29L 2023/004
See application file for complete search history.

(56) References Cited

U.S. PATENT DOCUMENTS 4,836,246 A * 6/1989 Lemp .................. F16L 41/03
                                                 137/561 A
5,395,139 A * 3/1995 Morrisson ............ F16L 41/03
                                                 285/330

(Continued)

FOREIGN PATENT DOCUMENTS

| CN | 108302274 A | 7/2018 |
| DE | 102017126296 A1 | 5/2019 |
| WO | 2020005656 A1 | 1/2020 |

OTHER PUBLICATIONS

International Search Report and Written Opinion for PCT Application No. PCT/US2022/073250, dated Sep. 27, 2022, pp. 24.

*Primary Examiner* — Frederick C Nicolas
(74) *Attorney, Agent, or Firm* — Kinney & Lange, P. A.

(57) ABSTRACT

A low-profile fluid manifold includes a tunable passive flow control system through intricate internal flow channels. The low-profile fluid manifold is manufactured using stereolithography (SLA) additive manufacturing to rapidly produce and tune the intricate flow channels to achieve the desired flow characteristics. Further, SLA additive manufacturing is used to build up inlet and outlet orifices in the flow direction, creating sealing surfaces for parallel oriented seals and sealing surfaces. The low-profile fluid manifold is manufactured to be air and liquid tight at the required operating pressures, temperatures, and environments, without the use of traditional fittings.

20 Claims, 3 Drawing Sheets

(56) References Cited

U.S. PATENT DOCUMENTS

| | | | |
|---|---|---|---|
| 7,063,276 B2 | 6/2006 | Newton | |
| 11,168,801 B2 * | 11/2021 | Glime, III | F16L 11/15 |
| 11,525,534 B2 * | 12/2022 | Kluss | F16L 55/1157 |
| 2004/0025245 A1 * | 2/2004 | Pinciaro | A61H 33/027 |
| | | | 4/541.6 |
| 2005/0011575 A1 * | 1/2005 | Headley | F16L 41/03 |
| | | | 138/37 |
| 2012/0286506 A1 * | 11/2012 | McKenzie | E03C 1/023 |
| | | | 285/125.1 |
| 2020/0003318 A1 * | 1/2020 | Glime, III | F16K 27/003 |
| 2021/0048131 A1 | 2/2021 | Hansen et al. | |
| 2021/0172553 A1 * | 6/2021 | Kluss | F16L 43/008 |
| 2022/0042616 A1 * | 2/2022 | Glime, III | F16L 11/15 |

* cited by examiner

ADDITIVE MANUFACTURED LIQUID MANIFOLD WITH ORIFICE

STATEMENT OF GOVERNMENT INTEREST

This invention was made with government support. The government has certain rights in the invention.

BACKGROUND

The present invention relates to a liquid manifold, and more particularly to an additively manufactured low-profile fluid manifold with tunable passive flow control.

In some applications, fluid manifolds are configured to receive fluid from multiple sources and then dispense the received fluid through multiple outlets. Previous manifolds can be manufactured using standard machining techniques and include standard fluid fittings and active flow regulators (e.g., actuators and valves) to control the flow characteristics of the fluid flowing through the manifold. Some fluid manifold applications require the fluid manifold be implemented in very small spaces, which is difficult to accomplish with previous fluid manifolds including standard fittings and active flow regulators. As such, a fluid manifold is desired that fits and operates in very small spaces while allowing for passive flow control to achieve the desired flow characteristics.

SUMMARY

According to one aspect of the disclosure, a low-profile fluid manifold is disclosed. The low-profile fluid manifold includes a first fluid input orifice, a first fluid output orifice, a second fluid output orifice, a fluid reservoir, a first fluid input line, a first fluid output line, and a second fluid output line. The first fluid input orifice includes a first internal threadless seal. The first and second fluid output orifices include a second and third internal threadless seal, respectively. The first fluid input line connects the first fluid input orifice to the fluid reservoir. The first fluid output line connects the fluid reservoir to the first fluid output orifice. The second fluid output line connects the fluid reservoir to the second fluid output orifice. The first fluid output orifice has a first output diameter, the second fluid output orifice has a second output diameter, and the first output diameter is larger than the second output diameter. The first fluid input orifice has an internal surface structure in contact with the first internal threadless seal and is configured to create a fluid tight seal.

DETAILED DESCRIPTION

Figure 1:
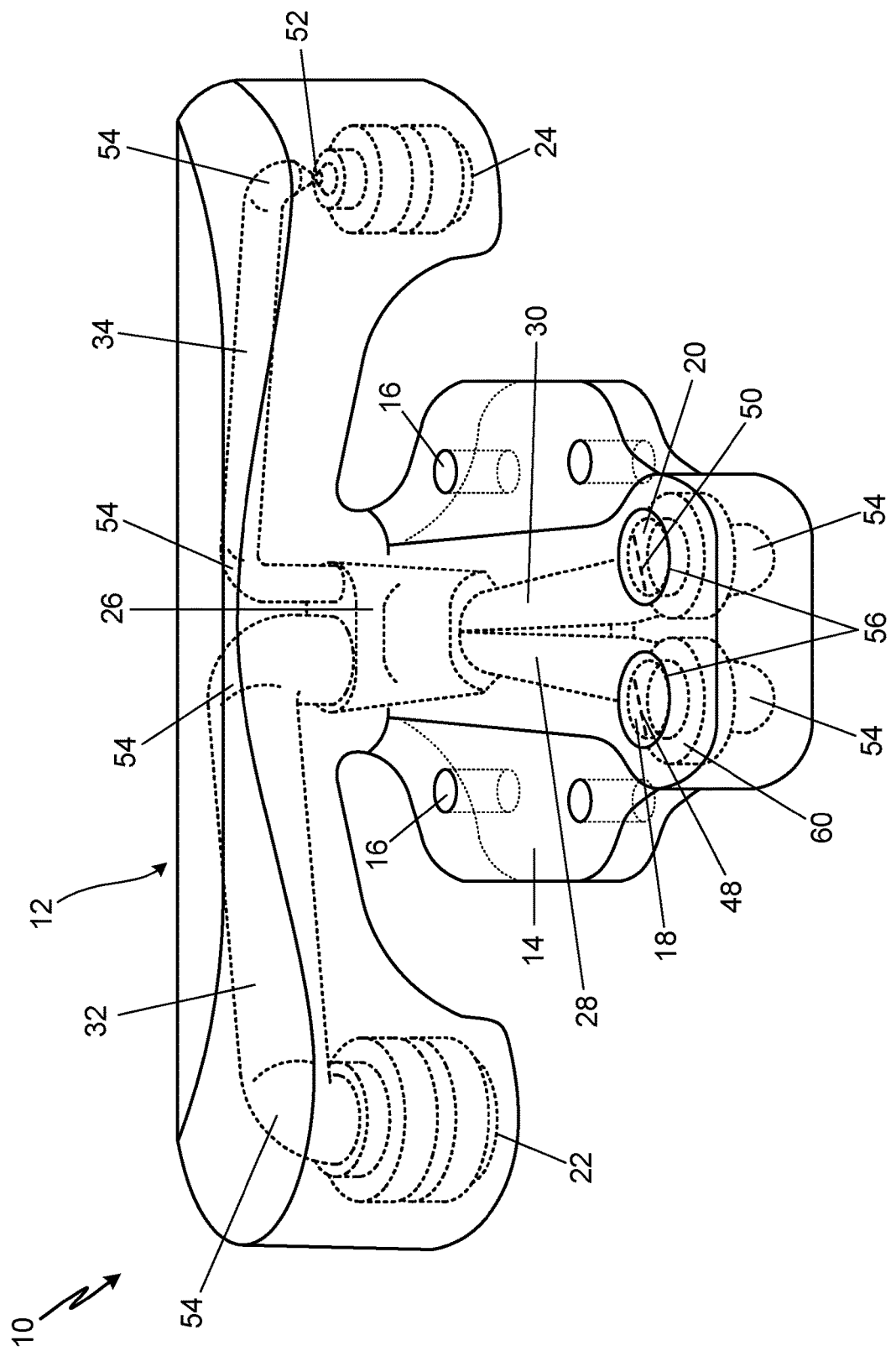
FIG. 1 is a perspective view of a representative low-profile fluid manifold.
Figure 2:
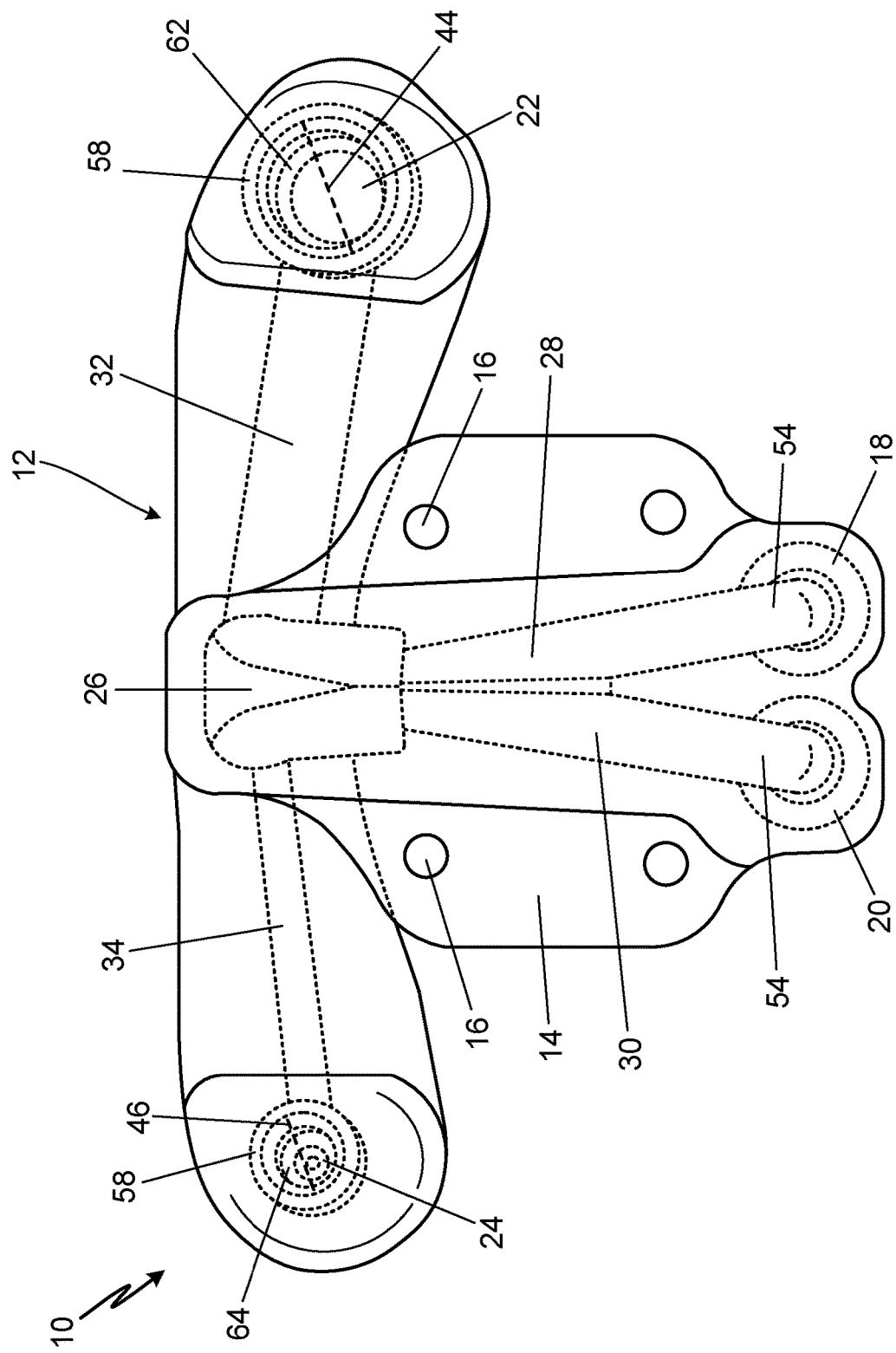
FIG. 2 is a bottom view of the low-profile fluid manifold of FIG. 1.
Figure 3:
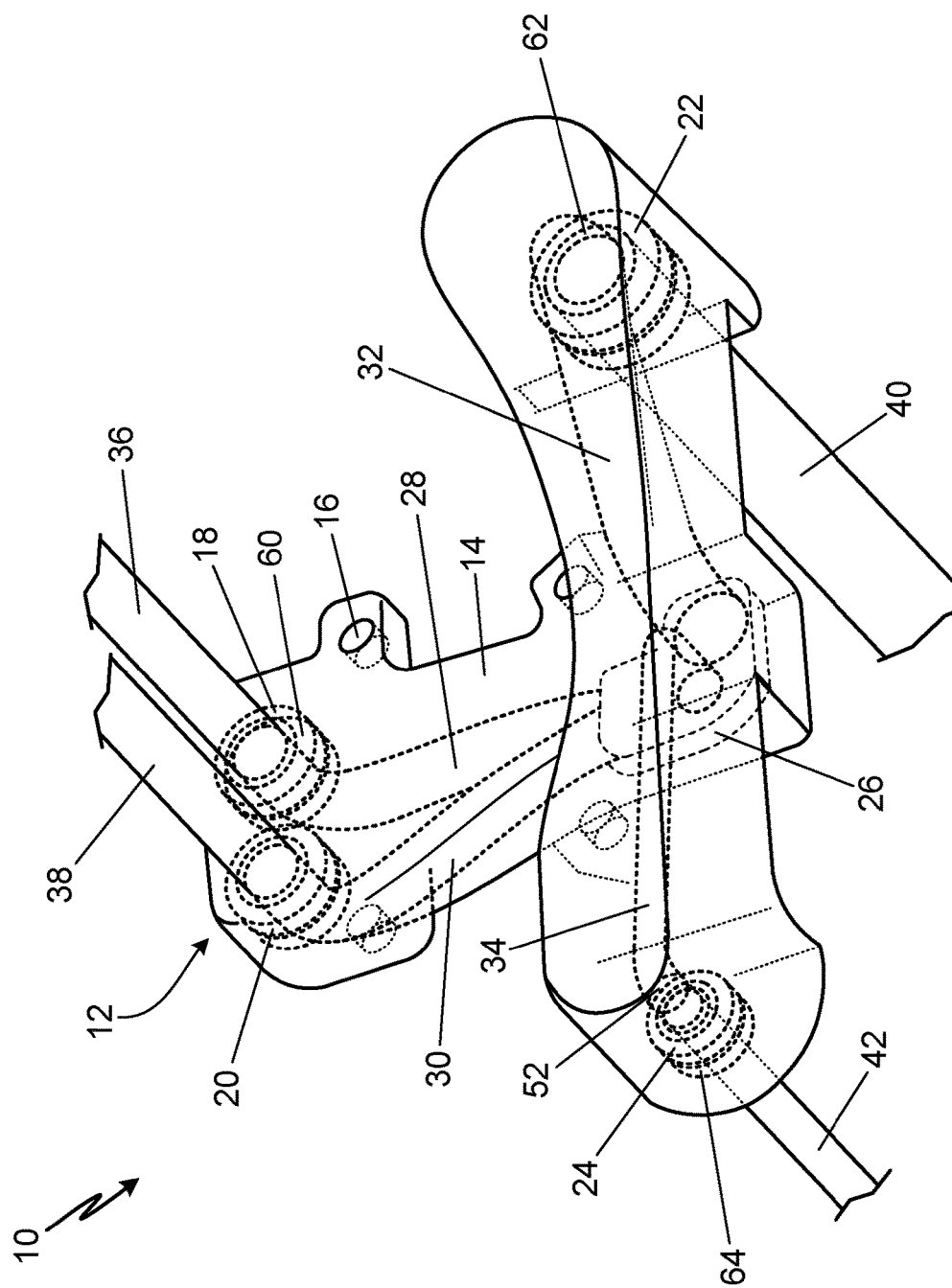
FIG. 3 is a perspective view of the low-profile fluid manifold with coupled fluid input and output lines.

FIG. 1 is a perspective view of low-profile fluid manifold 10 (hereinafter referred to as "manifold 10"). FIG. 2 is a bottom view of manifold 10. FIG. 3 is a perspective view of manifold 10 with coupled fluid input lines and fluid output lines. FIGS. 1-3 will be discussed together. Manifold 10 is a low-profile fluid manifold that is configured to receive fluids (liquid or gas) from one or more inlets, mix the fluids, and then dispense the mixed fluids through multiple outlets. Manifold 10 is low-profile in design, meaning the plane of the face of the input orifices is closely positioned to the plane of the face of the output orifices, discussed further below. The low-profile design of manifold 10 allows manifold 10 to fit and operate within small spaces of an overall fluid system. Further, axially offset positioning of the input orifices and output orifices allows non-aligned input/output tubes to be fluidly connected through manifold 10, discussed further below.

Manifold 10 includes body 12, which is the main body portion of manifold 10 that the internal flow channels are positioned within. In some examples, body 12 can be manufactured using an additive manufacturing process. In one embodiment, body 12 can be manufactured using a stereolithography (SLA) additive manufacturing process using resins made from thermoset polymers. The SLA additive manufacturing process allows for ease of build, smooth surface finish for engaging seals, and minimized viscous losses through the material, as compared to traditional machining operations. Further, the SLA additive manufacturing process allows for intricate flow channel designs within body 12, allowing the user to design the flow channels and orifices to regulate flow rate and pressure drops across manifold 10. As such, SLA additive manufacturing allows manifold 10 to be quickly produced at a low cost and allows easy modification of the flow characteristics through the internal flow channels to achieve the desired result.

Body 12 includes mounting flange 14 and apertures 16. Mounting flange 14 is a feature of body 12 that is configured to be positioned adjacent and abutting stationary components of the overall flow system. Mounting flange 14 includes at least one aperture 16 extending through mounting flange 14, with the at least one aperture 16 configured to accept a fastener. In the embodiment shown in FIGS. 1-3, mounting flange 14 include four apertures 16 extending through mounting flange 14. In other embodiments, mounting flange 14 can include more or less than four apertures 16 extending through mounting flange 14. Further, mounting flange 14 and apertures 16 can be positioned at any location about body 12 of manifold 10 to mate with the stationary support structure of the overall flow system. Mounting flange 14 and the at least one aperture 16 are features configured to secure manifold 10 to stationary components of the overall flow system.

Positioned within an interior of body 12 are first fluid input orifice 18, second fluid input orifice 20, first fluid output orifice 22, second fluid output orifice 24, fluid reservoir 26, first fluid input line 28, second fluid input line 30, first fluid output line 32, and second fluid output line 34. First fluid input orifice 18 is an aperture or hole that is configured to receive a fluid from a fluid source (not shown). More specifically, as shown in FIG. 3, first fluid input orifice 18 is configured to accept first tube 36 and receive a fluid from first tube 36. Second fluid input orifice 20 is an aperture or hole that is positioned adjacent first fluid input orifice 18 and configured to receive a fluid from a fluid source (not shown). More specifically, as shown in FIG. 3, second fluid input orifice 20 is configured to accept second tube 38 and receive a fluid from second tube 38. In the embodiment shown, manifold 10 includes first fluid input orifice 18 and second fluid input orifice 20. In another embodiment, manifold 10 can include one of first fluid input orifice 18 or second fluid input orifice 20, such that manifold 10 includes a single input orifice. In yet another embodiment, manifold 10 can include more than first fluid input orifice 18 and second fluid input orifice 20, such that manifold 10 includes three or more input orifices.

First fluid output orifice 22 is an aperture or hole that is configured to dispense or transfer a fluid from manifold 10. More specifically, as shown in FIG. 3, third tube 40 is inserted into first fluid output orifice 22 and first fluid output orifice 22 is configured to dispense or transfer fluid from manifold 10 into third tube 40. Second fluid output orifice 24 is an aperture or hole that is configured to dispense or transfer a fluid from manifold 10. More specifically, as shown in FIG. 3, fourth tube 42 is inserted into second fluid output orifice 24 and second fluid output orifice 24 is configured to dispense or transfer fluid from manifold 10 into fourth tube 42. In the embodiment shown, manifold 10 includes first fluid output orifice 22 and second fluid output orifice 24. In another embodiment, manifold 10 can include one of first fluid output orifice 22 or second fluid output orifice 24, such that manifold 10 includes a single output orifice. In yet another embodiment, manifold 10 can include more than first fluid output orifice 22 and second fluid output orifice 24, such that manifold 10 includes three or more output orifices.

Fluid reservoir 26 is a chamber or cavity positioned within an interior of body 12 of manifold 10 that fluidly connects first fluid input line 28, second fluid input line 30, first fluid output line 32, and second fluid output line 34. First fluid input line 28 is a fluid path or flow channel within body 12 that fluidly connects first fluid input orifice 18 to fluid reservoir 26. Second fluid input line 30 is a fluid path or flow channel within body 12 that fluidly connects second fluid input orifice 20 to fluid reservoir 26. First fluid output line 32 is a fluid path or flow channel within body 12 that fluidly connects fluid reservoir 26 to first fluid output orifice 22. Second fluid output line 34 is a fluid path or flow channel within body 12 that fluidly connects fluid reservoir 26 to second fluid output orifice 24. In operation, fluid enters manifold 10 through first fluid input orifice 18 and second fluid input orifice 20 and transfers through first fluid input line 28 and second fluid input line 30, respectively, to fluid manifold 10. The fluid with fluid manifold 10 mixes and the fluid mixture flows through first fluid output line 32 and second fluid output line 34 to first fluid output orifice 22 and second fluid output orifice 24, respectively. The fluid mixture then flows out of manifold 10 and into third tube 40 and fourth tube 42 to be used downstream by the flow system.

As shown in FIGS. 1-3, first fluid output orifice 22 has a first output diameter 44 and second fluid output orifice 24 has a second output diameter 46, with the first output diameter 44 being larger than the second output diameter 46. Further, first fluid output line 32 includes a first fluid line output diameter, second fluid output line 34 includes a second fluid line output diameter, and the first fluid line output diameter is greater than the second fluid line output diameter. The diameters of orifices 22, 24 and fluid output lines 32, 34 can be different diameters to alter the fluid flow rate and pressure drops of the fluid flowing through manifold 10 to achieve the desired flow characteristics. In other embodiments, the diameters of orifices 22, 24 and fluid output lines 32, 34 can vary depending on the required flow characteristics of the flow system. In addition, second fluid output line 34 can include flow regulator neck 52 to further alter the fluid flow rate and pressure drops of the fluid flowing through manifold 10 to achieve the desired flow characteristics. In the embodiment shown, flow regulator neck 52 is positioned adjacent second fluid output orifice 24. In another embodiment, flow regulator neck 52 can be positioned anywhere along second fluid output line 34 to alter the flow characteristics as desired.

Further, as shown with reference to FIGS. 1-3, first fluid input orifice 18 and second fluid input orifice 20 can include first input diameter 48 and second input diameter 50, respectively. In the embodiment shown, first input diameter 48 and second input diameter 50 are the same diameter. In other examples, first input diameter 48 and second input diameter 50 can be different diameters. In addition, in the embodiment shown, first input diameter 48 and second input diameter 50 are smaller than first output diameter 44 and larger than second output diameter 46. Therefore, first fluid input orifice 18, first fluid output orifice 22, and second fluid output orifice 24 are individually sized to receive first tube 36, third tube 40, and fourth tube 42, respectively. In other embodiments, each of first input diameter 48, second input diameter 50, first output diameter 44, and second output diameter 46 can be vary to alter the flow characteristics of fluid flowing through manifold 10.

As shown best in FIG. 1, manifold 10 includes a plurality of bends 54 (or turns) of the internal flow channels of manifold 10. More specifically, first fluid input line 28 and second fluid input line 30 each include bend 54 between 45 degrees and 105 degrees. In some examples, bend 54 within first fluid input line 28 and second fluid input line 30 can be about 90 degrees. Similarly, first fluid output line 32 and second fluid output line 34 each include at least one bend 54 between 45 degrees and 105 degrees. In the example shown, first fluid output line 32 and second fluid output line 34 each include two bends 54. In another example, first fluid output line 32 and second fluid output line 34 can each include more less than two of bends 54. In some examples, bend 54 within first fluid output line 32 and second fluid output line 34 can be about 90 degrees. Bends 54 are configured to position first fluid input orifice 18, second fluid input orifice 20, first fluid output orifice 22, and second fluid output orifice 24 at the correct locations within the flow system to mate with first tube 36, second tube 38, third tube 40, and fourth tube 42, respectively. Further, bends 54 can be utilized to alter the flow characteristics of manifold 10.

First fluid input orifice 18 and second fluid input orifice 20 are located in a first plane, with respect to first face surface 56 of first fluid input orifice 18 and second fluid input orifice 20. Further, first fluid output orifice 22 and second fluid output orifice 24 are located in a second plane, with respect to second face surface 58 of first fluid output orifice 22 and second fluid output orifice 24. The first plane and the second plane are offset from each other by a distance and the first plane and the second plane are parallel with each other. In other embodiments, the first plane and the second plane may not be parallel with each other. Further, first fluid input orifice 18 and second fluid input orifice 20 face in a first axial direction, with respect to a central axis of first fluid input orifice 18 and second fluid input orifice 20. First fluid output orifice 22 and second fluid output orifice 24 face in a second axial direction, which is about 180 degrees from the first axial direction. As such, first fluid input orifice 18 and second fluid input orifice 20 face in one direction and first fluid output orifice 22 and second fluid output orifice 24 face in a second direction, opposite the first direction (by about 180 degrees).

The orientation of first fluid input orifice 18, second fluid input orifice 20, first fluid output orifice 22, and second fluid output orifice 24 allow manifold 10 to receive a fluids, mix the fluids, and dispense the fluids through tubes 36, 38, 40, and 42 while maintaining the same overall flow direction through the fluid system. Further, the orientation and positioning of first fluid input orifice 18, second fluid input orifice 20, first fluid output orifice 22, and second fluid output orifice 24 allow fluid to flow through tubes that are offset in the planar direction (as described) as well as axially offset, such that the central axis of first fluid input orifice 18 and second fluid input orifice 20 are not axially aligned with the central axis of first fluid output orifice 22 and second fluid output orifice 24. Additionally, the overall shape of manifold 10 allows manifold 10 to receive fluids, mix the fluids, and dispense the fluid mixture through offset tubes, while maintaining a compact design and allowing for passive flow control (through differing diameters, bends 54, and flow regulator neck 52) to achieve the desired flow characteristics.

Referring again to FIG. 3, first tube 36 and second tube 38 are inserted and positioned within first fluid input orifice 18 and second fluid input orifice 20, respectively. Positioned between an internal end face of first fluid input orifice 18 and a distal end of first tube 36 is first internal threadless seal 60. First internal threadless seal 60 can be an O-ring seal compressed between an internal end face of first fluid input orifice 18 and a distal end of first tube 36 that is configured to seal the interface between first fluid input orifice 18 and first tube 36. Further, an internal surface structure of first fluid input orifice 18 is in contact with first internal threadless seal 60 and the internal surface structure is configured to create a fluid tight seal between first fluid input orifice 18 and first tube 36 at pressures up to and including 40 pounds per square inch (psi) when compressed between first fluid input orifice 18 and first tube 36. The fluid tight seal is configured to provide sealing capabilities for both gases and liquids alike. Although not specifically shown, second fluid input orifice 20 can include an internal threadless seal as described with reference to first fluid input orifice 18 and first internal threadless seal 60.

Third tube 40 is inserted and positioned within first fluid output orifice 22. Positioned between an internal end face of first fluid output orifice 22 and a distal end of third tube 40 is second internal threadless seal 62. Second internal threadless seal 62 can be an O-ring seal compressed between an internal end face of first fluid output orifice 22 and a distal end of third tube 40 that is configured to seal the interface between first fluid output orifice 22 and third tube 40. Further, an internal surface structure of first fluid output orifice 22 is in contact with second internal threadless seal 62 and the internal surface structure is configured to create a fluid tight seal between first fluid output orifice 22 and third tube 40 at pressures up to and including 40 pounds per square inch (psi) when compressed between first fluid output orifice 22 and third tube 40. The fluid tight seal is configured to provide sealing capabilities for both gases and liquids alike. In the embodiment described, first fluid output orifice 22 includes a single seal (second internal threadless seal 62) positioned within first fluid output orifice 22. In another embodiment, first fluid output orifice 22 can include two or more seals positioned within first fluid output orifice 22, such that the two or more seals are positioned adjacent one another and provide additional sealing capabilities for both gases and liquids alike.

Fourth tube 42 is inserted and positioned within second fluid output orifice 24. Positioned between an internal end face of second fluid output orifice 24 and a distal end of fourth tube 42 is third internal threadless seal 64. Third internal threadless seal 64 can be an O-ring seal compressed between an internal end face of second fluid output orifice 24 and a distal end of fourth tube 42 that is configured to seal the interface between second fluid output orifice 24 and fourth tube 42. Further, an internal surface structure of second fluid output orifice 24 is in contact with third internal threadless seal 64 and the internal surface structure is configured to create a fluid tight seal between second fluid output orifice 24 and fourth tube 42 at pressures up to and including 40 pounds per square inch (psi) when compressed between second fluid output orifice 24 and fourth tube 42. The fluid tight seal is configured to provide sealing capabilities for both gases and liquids alike. In the embodiment described, second fluid output orifice 24 includes a single seal (third internal threadless seal 64) positioned within second fluid output orifice 24. In another embodiment, second fluid output orifice 24 can include two or more seals positioned within second fluid output orifice 24, such that the two or more seals are positioned adjacent one another and provide additional sealing capabilities for both gases and liquids alike.

The seals (first internal threadless seal 60, second internal threadless seal 62, third internal threadless seal 64, etc.) positioned within orifices 18, 20, 22, and 24 are configured to provide a sealing interface between manifold 10 and tubes 36, 38, 40, and 42 without the use of traditional fittings. More specifically, manifold 10 is completely threadless, including both the interior and exterior of manifold 10. As such, tubes 36, 38, 40, and 42 are inserted and secured within orifices 18, 20, 22, and 24, respectively, through a friction or interference fit (without traditional fasteners or couplers). Further, the seals positioned between tubes 36, 38, 40, and 42 and orifices 18, 20, 22, and 24 create a sealing interface between the respective components, preventing leakage from manifold 10. Therefore, manifold 10 is configured to receive fluids, mix the fluids, and dispense the fluid mixture with passive flow control while having a completely threadless design.

As mentioned, manifold 10 can be manufactured using an additive manufacturing process. In one embodiment, manifold 10 can be manufactured using a stereolithography (SLA) additive manufacturing process using resins made from thermoset polymers. More specifically, a method of making manifold 10 can include the steps of growing manifold 10 in a grow direction using stereolithography additive manufacturing and inserting first internal threadless seal 60, second internal threadless seal 62, and third internal threadless seal 64 into each of first fluid input orifice 18, first fluid output orifice 22, and second fluid output orifice, respectively. The method of manufacturing manifold 10 can further include the step of growing first fluid input orifice 18, second fluid input orifice 20, first fluid output orifice 22, and second fluid output orifice 24 in a direction parallel with a central axis (perpendicular to the first plane of first fluid input orifice 18 and second fluid input orifice 20) of each of orifice 18, 20, 22, and 24. More specifically, layer by layer manifold 10 is manufactured using an SLA additive manufacturing process with each layer being added (or grown) in a direction that is parallel with a central axis of each of orifice 18, 20, 22, and 24. Manufacturing and growing manifold 10 in this specific manner creates surface finishes within orifices 18, 20, 22, and 24, that are ideal sealing surfaces for seals 60, 62, and 64, preventing fluid leakage from manifold 10. Further, manufacturing and growing manifold 10 in this specific manner creates a final manifold 10 in which post machining is not required to obtain the internal surface structure ideal for sealing as well as controlling fluid flow rate and pressure drop across manifold 10. Manifold 10 is a fluid manifold that fits and operates in very small spaces while still allowing for passive flow control to achieve the desired flow characteristics within a fluid system.

DISCUSSION OF POSSIBLE EMBODIMENTS

The following are non-exclusive descriptions of possible embodiments of the present invention.

A low-profile fluid manifold comprising: a first fluid input orifice having a first internal threadless seal; a first and second fluid output orifice having a second and third internal threadless seal, respectively; a fluid reservoir; a first fluid input line connecting the first fluid input orifice to the fluid reservoir; a first fluid output line connecting the fluid reservoir to the first fluid output orifice; and a second fluid output line connecting the fluid reservoir to the second fluid output orifice; wherein the first fluid output orifice has a first output diameter and the second fluid output orifice has a second output diameter, and the first output diameter is larger than the second output diameter; and wherein the first fluid input orifice has an internal surface structure in contact with the first internal threadless seal configured to create a fluid tight seal.

The low-profile fluid manifold of the preceding paragraph can optionally include, additionally and/or alternatively, any one or more of the following features, configurations and/or additional components:

The first fluid input orifice is located in a first plane, the first fluid output orifice is located in a second plane, and the first plane and the second plane are parallel.

A second fluid input orifice and a second fluid input line, wherein the second fluid input line connects the fluid reservoir to the second fluid input orifice.

The first fluid input orifice and the second fluid input orifice are located in a first plane, the first fluid output orifice and second fluid output orifice are located in a second plane, and the first plane and the second plane are parallel.

The first fluid input line comprises a bend, wherein the bend is between 45° and 105°.

The first fluid output line comprises a bend, wherein the bend is between 45° and 105°.

The second fluid output line comprises a flow regulator neck.

The first fluid output line comprises a first fluid line output diameter, the second fluid output line comprises a second fluid line output diameter, and the first fluid line output diameter is greater than the second fluid line output diameter.

The first internal threadless seal comprises an O-ring seal.

The exterior of the manifold is threadless.

The first fluid output orifice comprises two O-ring seals.

The first fluid input orifice includes a first input diameter, and wherein the first input diameter is smaller than the first output diameter and larger than the second output diameter.

A mounting flange, the mounting flange comprising two apertures configured to receive fasteners.

The first fluid input orifice, the first fluid output orifice, and the second fluid output orifice are individually sized to receive tubing.

A method of making the fluid manifold, the method comprising: growing the fluid manifold in a grow direction using stereolithography additive manufacturing; and inserting O-ring seals into each of the first fluid input orifice, the first fluid output orifice, and the second fluid output orifice.

The first fluid input orifice is located in a first plane, and the grow direction is perpendicular to the first plane.

The first and second fluid output orifices are located in a second plane parallel to the first plane.

Post machining is not required to obtain internal surface structure.

The manifold is constructed from a resin including thermoset polymers.

Inserting the threadless seals into the first fluid input orifice, the first fluid output orifice, the second fluid input orifice, or a combination thereof.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A low-profile fluid manifold comprising:
    a first fluid input orifice having a first internal threadless seal;
    a first and second fluid output orifice having a second and third internal threadless seal, respectively;
    a fluid reservoir;
    a first fluid input line connecting the first fluid input orifice to the fluid reservoir;
    a first fluid output line connecting the fluid reservoir to the first fluid output orifice; and
    a second fluid output line connecting the fluid reservoir to the second fluid output orifice;
    wherein the first fluid output orifice has a first output diameter and the second fluid output orifice has a second output diameter, and the first output diameter is larger than the second output diameter; and
    wherein the first fluid input orifice has an internal surface structure in contact with the first internal threadless seal configured to create a fluid tight seal.

2. The fluid manifold of claim 1, wherein the first fluid input orifice is located in a first plane, the first fluid output orifice is located in a second plane, and the first plane and the second plane are parallel.

3. The fluid manifold of claim 1 and further comprising a second fluid input orifice and a second fluid input line, wherein the second fluid input line connects the fluid reservoir to the second fluid input orifice.

4. The fluid manifold of claim 3, wherein the first fluid input orifice and the second fluid input orifice are located in a first plane, the first fluid output orifice and second fluid output orifice are located in a second plane, and the first plane and the second plane are parallel.

5. The fluid manifold of claim 1, wherein first fluid input line comprises a bend, wherein the bend is between 45° and 105°.

6. The fluid manifold of claim 1, wherein first fluid output line comprises a bend, wherein the bend is between 45° and 105°.

7. The fluid manifold of claim 1, wherein second fluid output line comprises a flow regulator neck.

8. The fluid manifold of claim 1, wherein the first fluid output line comprises a first fluid line output diameter, the second fluid output line comprises a second fluid line output diameter, and the first fluid line output diameter is greater than the second fluid line output diameter.

9. The fluid manifold of claim 1, wherein the first internal threadless seal comprises an O-ring seal.

10. The fluid manifold of claim 1, wherein the exterior of the manifold is threadless.

11. The fluid manifold of claim 1, wherein the first fluid output orifice comprises two O-ring seals.

12. The fluid manifold of claim 1, wherein the first fluid input orifice includes a first input diameter, and wherein the first input diameter is smaller than the first output diameter and larger than the second output diameter.

13. The fluid manifold of claim 1 and further comprising a mounting flange, the mounting flange comprising two apertures configured to receive fasteners.

14. The fluid manifold of claim 1, wherein the first fluid input orifice, the first fluid output orifice, and the second fluid output orifice are individually sized to receive tubing.

15. A method of making the fluid manifold of claim 1, the method comprising:
    growing the fluid manifold in a grow direction using stereolithography additive manufacturing; and
    inserting O-ring seals into each of the first fluid input orifice, the first fluid output orifice, and the second fluid output orifice.

16. The method of claim 15, wherein the first fluid input orifice is located in a first plane, and the grow direction is perpendicular to the first plane.

17. The method of claim 16, wherein the first and second fluid output orifices are located in a second plane parallel to the first plane.

18. The method of claim 15, wherein post machining is not required to obtain internal surface structure.

19. The method of claim 15, wherein the manifold is constructed from a resin including thermoset polymers.

20. The method of claim 15 and further comprising inserting the threadless seals into the first fluid input orifice, the first fluid output orifice, the second fluid input orifice, or a combination thereof.

* * * * *